US005559758A

United States Patent [19]

Wilson

[11] Patent Number: 5,559,758

[45] Date of Patent: Sep. 24, 1996

[54] ALERTING PROCESS

[75] Inventor: William A. Wilson, Anaheim, Calif.

[73] Assignee: Rockwell International Corporation, Seal Beach, Calif.

[21] Appl. No.: 318,890

[22] Filed: Mar. 6, 1989

[51] Int. Cl.[6] .............................. H04B 1/06

[52] U.S. Cl. .............................. 367/136

[58] Field of Search .............................. 367/135, 136, 367/118, 119, 124; 340/566

[56] References Cited

U.S. PATENT DOCUMENTS 3,745,552 7/1973 Wilt .............................. 367/136

*Primary Examiner*—Daniel T. Pihulic
*Attorney, Agent, or Firm*—George A. Montanye; Charles T. Silberberg; Tom Streeter

[57] ABSTRACT

An alerting process is presented that uses the steps of first receiving at least a first signal from a signal source for a predetermined short interval. The first signal is analyzed over the predetermined short interval to obtain the spectral energy of the first signal within contiguous incremental frequency bands that extend over the frequency spectrum of interest. The energy value obtained for each incremental frequency band is then stored as a short term integrated value in a memory at an address location corresponding to the incremental frequency. Successive short term integrated values are then integrated over a predetermined long term interval to obtain a long term integrated value for each respective incremental frequency band. Each short term integrated value is then divided by the corresponding long term integrated value to obtain an enhanced STI frequency value for each incremental frequency band. The frequency of each enhanced STI frequency value exceeding a predetermined threshold is then stored in a memory system. A present track frequency value is calculated as the centroid of adjacent stored STI frequency values. Present track frequency values are correlated with past track frequency values to form and extend frequency tracks. The variance value for each present track frequency value is calculated for a predetermined number of past frequency values corresponding to the same frequency track. An alert signal is provided in response to a variance value exceeding a predetermined threshold.

15 Claims, 3 Drawing Sheets

STI ENERGY VALUES

| TIME | | | | | | | |
|---|---|---|---|---|---|---|---|
| 1 | 1 | 1 | 2 | 12 | 1 | 1 | 1 |
| 2 | 1 | 1 | 1 | 12 | 1 | 1 | 1 |
| 3 | 1 | 2 | 1 | 12 | 1 | 1 | 1 |
| 4 | 1 | 1 | 2 | 12 | 1 | 1 | 1 |
| 5 | 1 | 2 | 1 | 12 | 1 | 1 | 1 |
| 6 | 1 | 1 | 2 | 12 | 1 | 1 | 1 |

FIG. 3a

LTI ENERGY VALUES

| TIME | | | | | | | |
|---|---|---|---|---|---|---|---|
| 1 | 1 | 1.5 | 1.5 | 12 | 1 | 1 | 1 |
| 2 | 1 | 1.5 | 1.5 | 12 | 1 | 1 | 1 |
| 3 | 1 | 1.5 | 1.5 | 12 | 1 | 1 | 1 |
| 4 | 1 | 1.5 | 1.5 | 12 | 1 | 1 | 1 |
| 5 | 1 | 1.5 | 1.5 | 12 | 1 | 1 | 1 |
| 6 | 1 | 1.5 | 1.5 | 12 | 1 | 1 | 1 |

FIG. 3b

STI/LTI VALUES

| TIME | | | | | | | |
|---|---|---|---|---|---|---|---|
| 1 | 1 | 0.7 | 1.3 | 1 | 1 | 1 | 1 |
| 2 | 1 | 0.7 | 0.7 | 1 | 1 | 1 | 1 |
| 3 | 1 | 1.3 | 0.7 | 1 | 1 | 1 | 1 |
| 4 | 1 | 0.7 | 1.3 | 1 | 1 | 1 | 1 |
| 5 | 1 | 1.3 | 0.7 | 1 | 1 | 1 | 1 |
| 6 | 1 | 0.7 | 1.3 | 1 | 1 | 1 | 1 |
| | 1 | 2 | 3 | 4 | 5 | 6 | 7 |

FREQUENCY SPECTRUM

PREDETERMINED INCREMENTAL FREQUENCY BAND

FIG. 3c

ALERTING PROCESS

FIELD OF THE INVENTION

The invention alerting process relates to the field of Acoustic Signal Detection and more particularly to the field of Acoustic Signal Processing for detecting torpedoes or other moving targets in an ocean environment. The invention alerting process economically detects and alerts the operator of a Surface Ship Alerting System (SSAS) to approaching torpedoes,

PRIOR ART

The Surface Ship Alerting System receives analog signals from passive sonar arrays. To obtain the direction of the target of interest from the sound received, signals from arrays of detectors are optionally beam formed and then analyzed for their spectral content. The signal energy for each frequency of interest is integrated and the digitized value of energy for each frequency range is recorded for each time interval integration.

The Interval selected for integration for Surface Ship Alerting Systems is typically 0.8 second. The frequency resolution bands over which integration is performed typically has a Q of 600–800. Each integration value is recorded in a memory location associated with a frequency called a BIN. A Surface Ship Alerting System typically monitors a spectral range of several kilohertz. Thousands of values of integration data must be stored with each passing second for each of the frequency bands or bins for which integration is performed.

The sound of torpedoes can be detected at great distances, but alerting is dependent on the Surface Ship Alerting Systems ability to analyze the values of energy recorded for each frequency or BIN over relatively long intervals In time.

Prior art systems such as the AN/BQO-9 or the AN/SQQ-89 made this data available by storing all of the data acquired over a period exceeding the possible interval of interest. Early prior art systems required interpretation by a skilled operator which had slow relation time due to operator workload. Automatic alerting was not provided by the prior art systems because the required signal processing technology had not been developed.

The invention alerting process raises the efficiency of a Passive Sonar System by identifying data that has a high probability of being of interest to the system and selectively discarding information having a low probability of being of interest. Economy is achieved by reducing the memory requirements of the Surface Ship Alerting System and by making early detection and automatic alerting possible.

SUMMARY OF THE INVENTION

The invention alerting process receives channels of signals from passive sonar arrays. The analog signals may either be or digital. If the signals are analog, they are isolation amplified and low pass filtered for antialiasing and then digitized. If the signals are not beams, (e.g. hydrophone, stave or cluster signals) they are beamformed. The resulting digital signals are analyzed by spectrum analysis to measure signal energy over a spectrum of interest. The values of signal energy that are measured by integration over a predetermined short time interval are then recorded as digital values for each of a series of predetermined incremental spectral intervals within the spectral range of interest. The short time intervals are referred to as STIs, and are typically 0.8 seconds in duration. The incremental spectral intervals are referred to as BINs and have a Q of 600–800. For a spectral range of interest that extends over the sensor range, up to 4 kilohertz, several hundred BIN memory locations are required for each second of STI interval. The values of energy stored in each BIN are integrated over a long time interval of approximately one minute to obtain long term interval, or LTI, values for each incremental frequency within the frequency spectrum of interest. A new LTI value for each frequency is calculated each STI time by reintegrating the BIN values for the corresponding frequency that have been stored for each STI time over the last LTI, i.e. the last sixty STI values for each corresponding incremental frequency over the spectrum of interest.

The STI data array is enhanced by a stable line removal process. The stable line removal process begins by dividing each STI value by the current LTI value for each incremental frequency. Normalized values of calculated energy per unit frequency for each STI that continue above a minimal threshold for an interval of more than one STI interval, represents an added increment in a line and are stored as enhanced STI values.

Normalized values below the STI/LTI threshold are produced by signal sources of fixed frequency that have relatively constant energy levels. High energy levels as well as low energy levels will produce quotient values of approximately one if they are unchanging. Lines formed from quotient values that remain within a single FFT BIN, or incremental frequency, and which have an amplitude of one, represent a stable line and are of no interest in the alerting process.

The alerting process is interested in unstable lines that have normalized energy levels that are above the predetermined STI/LTI threshold level and that are changing. The enhanced data array quotient values that are above the threshold represent energy levels that are changing and are saved.

A centroid extraction process is used to calculate the centroid of energy (the energy weighted mean frequency) for energy above the enhanced STI data array for each STI interval. The centroid is calculated for adjacent values of enhanced STI data, i.e. enhanced STI data for the same STI interval in adjacent BINs that exceeds the threshold by the following process. The value of the energy for each BIN is multiplied by the BIN frequency to obtain the energy quotient that is above the threshold to form a moment value for each BIN. Adjacent moment values are added. The sum of these adjacent moment values are then divided by the sum of the energy quotient values for the same adjacent BINs. The quotient formed by this process is the energy weighted mean frequency.

A feature extraction process samples the energy quotient values and the calculated centroids and forms tracks from the resulting centroid data values. The feature extraction process also calculates the variance of the centroid frequency values over a past time interval. A variance is calculated and stored for each centroid value. The variances are the estimated mean squared difference between the centroid frequencies and the estimated mean frequencies for each successive centroid frequency in a track. The values of the centroids and the values of the variance corresponding to each centroid represent the extracted features.

The feature extraction process has a save pool and a track pool. The save pool contains fragments which are lists of loosely correlated centroids which were not correlated with existing tracks. A fragment may contain a single centroid. A single centroid may exist in more than one fragment. The track pool contains tracks which are groups of histories of centroids that are correlated within predetermined limits. The tracks in the track pool are referred to as established tracks.

A track maintenance process monitors the history of each track. If a track is not periodically updated, the track is dropped. The feature extraction process outputs a list of frequencies and corresponding variances for each established track, and loads these features into buffer storage for display on LOFAR format displays. An automatic alerting process monitors the tracks and provides an alarm when the variance of an established track exceeds a predetermined threshold.

Normal STI data, enhanced STI data and established track data from the track pool are formatted and fed to buffers for selection and independent display on video display. The video is displayed in LOFAR format. The established tracks appear as disturbed lines as the frequency of a track varies slightly in time. As the variance of the track exceeds a series of predetermined levels, the color of the track is shifted from blue to yellow to red to alert an operator.

BRIEF DESCRIPTION OF THE DRAWINGS

FIG. 3*a*, 3*b* and 3*c* are sequential charts showing progress of data in producing enhanced STI values.

DESCRIPTION OF PREFERRED EMBODIMENT

Figure 1:
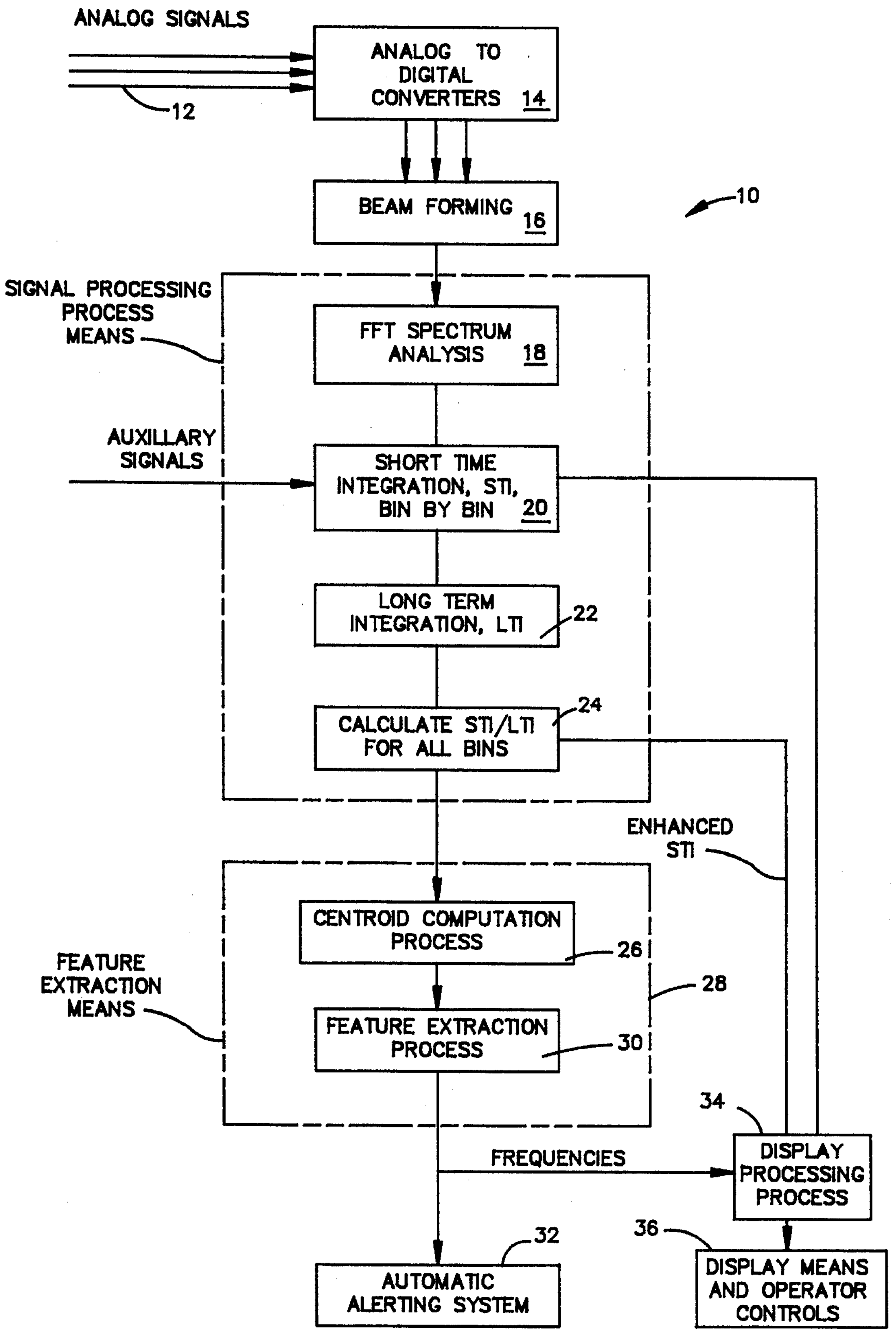
FIG. 1 is a block diagram of a surface ship alerting system.
Figure 2:
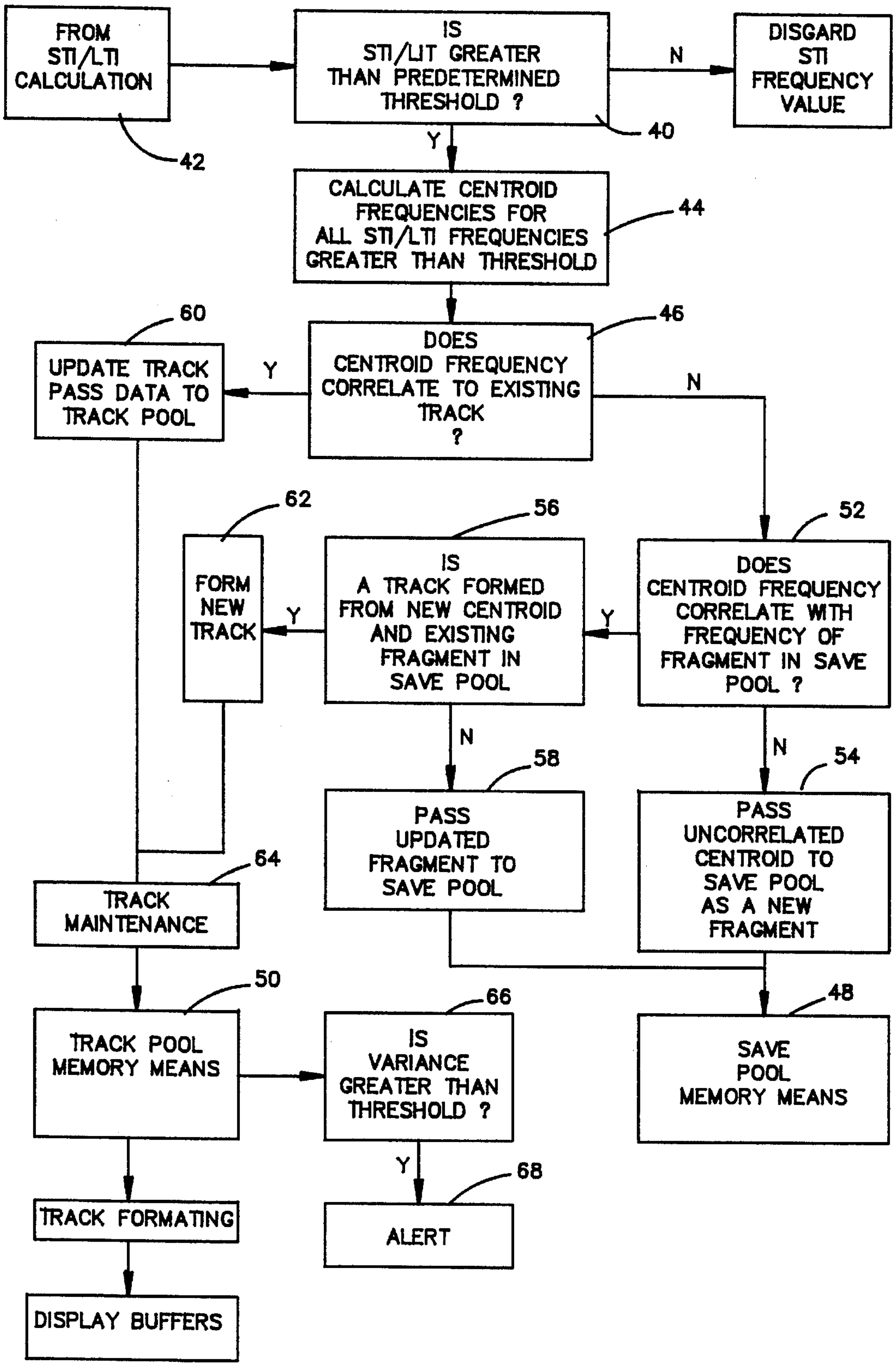
FIG. 2 is a block diagram of the feature extraction process.

The invention alerting process of FIGS. 1 and 2 receives channels of analog signals on signal lines 12 from sources, such as sonar arrays, which may be optionally beam formed, as in block 16 to improve sensitivity. The analog signals are converted to a series of sampled digital values in block 14 for analysis using known digital processing techniques, such as fast Fourier transform (FFT) analysis techniques as in block 18.

The analysis is typically performed over incremental frequency bands of a predetermined width. The FFT integration interval is typically 0.8 seconds. A 50% overlap with Hanning weighting is used to measure signal energy of the signal on signal line 12 over a spectrum of interest. Two FFT values are added to obtain an FFT value for an incremental frequency band.

Each incremental frequency band has a center frequency. The center frequency of each band is referred to as an FFT BIN. The bands are typically less than one cycle in width and they are contiguous in that the next higher frequency band starts as the previous band ends. The spectrum of interest for sonar systems is typically 50 Hz to 4.0 kHz.

Energy values are passed from the FFT analysis process 18 to block 20 for short term integration over a predetermined short time interval, or STI interval of typically 0.8 seconds. The values of signal energy obtained from the short term integration are referred to as STI energy values. The digital value of each short term integrated value is recorded in a digital memory at an address corresponding to the BIN frequency. The short term integration is performed over the short time interval for each predetermined incremental spectral interval within the spectral range of interest. For a spectral range of interest that extends over 4.0 kilohertz, several hundred BIN memory locations would be required for each STI interval.

Block 22 represents LONG TERM INTEGRATION, the LTI process of receiving successive STI energy values corresponding to a particular FFT BIN or center frequency and integrating the STI energy values or LTI values for each bin, or incremental frequency band within the frequency spectrum of interest. The LTI time interval selected for integration is typically one minute. A new LTI value for each frequency is calculated each second by reintegrating the BIN values for the corresponding frequency that have been stored for each 0.8 second interval over the last LTI, i.e. the last eighty-five (85) STI values for each corresponding incremental frequency band over the spectrum of interest. The values obtained as a result of averaging over a one minute interval changes very slowly with time.

The STI data array is enhanced by a stable line removal process by dividing the STI values for each BIN by the respective LTI value. Block 24 shows the step of dividing each current STI value by the current LTI value for each incremental frequency. This operation yields normalized values of calculated energy per unit frequency for each STI. The values obtained that penetrate a predetermined threshold are referred to as enhanced STI values.

Normalized values of STI/LTI that are below the threshold are produced by signal sources of fixed frequency that have relatively constant energy levels. High STI energy levels as well as low STI energy levels produce quotient values of approximately one if they are unchanging. Lines formed from quotient values that remain within a single FFT BIN, or incremental frequency and which have an amplitude in excess of the threshold represent a stable line.

The enhanced data array quotient values that are above the threshold are sampled by the CENTROID COMPUTATION PROCESS represented by block 26 in the FEATURE EXTRACTION PROCESS of phantom block 28. The centroid extraction process is used to calculate the centroid of energy (the energy weighted mean frequency) for energy above the enhanced STI data array for each STI interval. The centroid is calculated for adjacent values of enhanced STI data, i.e. enhanced STI data for the same STI interval in adjacent BINs that exceeds the threshold by the following process:

> The enhanced STI value, or normalized energy value for each BIN that penetrates the predetermined threshold is multiplied by the BIN frequency of the corresponding BIN to form a moment value for the corresponding BIN. Adjacent BIN moment values are added. The sum of the adjacent BIN moment values are then divided by the sum of the enhanced STI values for the same adjacent BINs. The quotient formed by this process is the energy weighted mean frequency.

Block 30 represents a FEATURE EXTRACTION PROCESS that samples and correlates the calculated centroids and forms tracks from the resulting centroid data values. The feature extraction process also calculates the variance of the centroid frequency values that correspond to a track over a past time interval. A variance is calculated and stored for each centroid value. The variances are the estimated mean squared difference between the centroid frequencies and the estimated mean frequencies for each successive centroid frequency in a track. The values of the centroids and the values of the variance corresponding to each centroid represent the extracted features.

The extracted features are used by the AUTOMATIC ALERTING SYSTEM represented by block 32 to provide an audible alarm to an operator. The extracted features are also fed to the display system represented by the DISPLAY PROCESSING PROCESS block 34 and the DISPLAY MEANS AND OPERATOR CONTROLS block 36. The features are formatted and stored in buffers for a LOFARGRAM type display with passing time for operator interpretation.

FIG. 2 provides a more detailed description of the process of the CENTROID COMPUTATION PROCESS 26, the FEATURE EXTRACTION PROCESS 30, the AUTOMATIC ALERTING SYSTEM 32, and the display processes of blocks 34 and 36. Block 40 represents the step of testing enhanced STI values from block 42 to determine if they penetrate the predetermined threshold.

Block 44 represents the step of calculating the centroid for adjacent BIN enhanced STI data, i.e. enhanced STI data for the same STI interval in adjacent BINs that exceeds the predetermined threshold. The enhanced STI value for each BIN that penetrates the predetermined threshold is multiplied by the BIN frequency of the corresponding BIN to form a moment value. Adjacent BIN moment values are then divided by the sum of the enhanced STI values for the same adjacent BINs to obtain an energy weighted mean frequency for adjacent contemporaneous BINs.

The feature extraction process has a save pool and a track pool. Block 46 represents the entry point for the process of correlating the centroid frequencies with recently calculated centroids or fragments in the SAVE POOL MEMORY 48 or with the existing tracks in the TRACK POOL MEMORY 50.

The SAVE POOL MEMORY 48 contains fragments which are groups of histories of centroids that are grossly correlated in frequency over time but which are not sufficiently correlated to form a track. A fragment can contain a single centroid value.

The TRACK POOL contains tracks which are groups of histories of centroids that are correlated within predetermined limits. The tracks in the track pool are referred to as established tracks.

If the correlating process determines that the calculated centroid does not correlate with an existing track, the process advances to the routine titled DOES CENTROID FREQUENCY CORRELATE WITH FREQUENCY OF FRAGMENT IN SAVE POOL of block 52. The fragments in the save pool are surveyed to make the required determination. The test for correlation typically requires the centroid frequency to be within a fixed tolerance of the mean frequency of the centroids in the fragment.

If the routine of block 52 fails to find a correlation, the process advances to the PASS UNCORRELATED CENTROID TO SAVE POOL AS A NEW FRAGMENT block 54 and the centroid is indexed and stored as a new fragment in the save pool.

If the centroid does correlate with a fragment in the save pool, the process advances to the IS A TRACK FORMED FROM NEW CENTROID AND EXISTING FRAGMENT IN SAVE POOL? block 56. If the resulting fragment fails to meet the requirements for a new track, the process advances to the PASS UPDATED FRAGMENT TO SAVE POOL block 58 and the save pool is updated with the extended fragment data. If the requirements for a new track are met by the test of block 56, the process advances to the FORM NEW TRACK block 62, The track maintenance process receives data via the UPDATE TRACK DATA TO TRACK block 60 and via the FORM NEW TRACK block 62, each of which provides updated track data via the TRACK MAINTENANCE block 64 which organizes and stores the updated tracks in the TRACK POOL MEMORY 50.

The track maintenance process of block 64 continues to monitor the history of each track. If a track is not periodically updated, the track is dropped. The feature extraction process outputs a list of frequencies and corresponding variances for each established track.

An automatic alerting process tests the variance of each track in the IS VARIANCE GREATER THAN THRESHOLD? block 66. If the variance of a track exceeds a threshold, an audible alarm is sounded via the ALERT box 68.

Normal STI data, enhanced STI data and established track data from the track pool are formatted for selection and independent display on a video display or chart recorder in which time is the independent variable. The display format is referred to as LOFAR format. The established tracks appear as disturbed longitudinal lines that extend with time. The frequency of a track varies slightly in time. As the variance of the track exceeds a series of predetermined levels, the color of the track is shifted from green to yellow to red to alert an operator.

FIG. 3*a* shows the value of energy being fed to seven BINs over six past intervals in time. FIG. 3*b* shows the corresponding LTI values assigned to same BINs over the same six intervals. FIG. 3*c* shows the enhanced STI value obtained by dividing the STI value by the STI value for the same time intervals. FIG. 3*c* shows that large STI energy values are washed out by the process If their LTI values have risen to their current level. STI values that are changing in amplitude would not be washed out. The values that continued to stand out in FIG. 3*c* are the values of STI that were small in energy but that were changing in frequency.

I claim:

1. An alerting process comprising the steps of:

receiving at least a first signal from a signal source for a predetermined short interval;

analyzing said first signal over said predetermined short interval to obtain the spectral energy of said first signal within contiguous incremental frequency bands extending over a frequency spectrum, the energy value obtained for each incremental frequency band being stored as a short term integrated value corresponding to said incremental frequency;

integrating successive short term integrated values over a predetermined long term interval to obtain a long term integrated value for each respective incremental frequency band;

dividing each short term integrated value by the corresponding long term integrated value to obtain an enhanced STI frequency value for each incremental frequency band;

storing the frequency of each enhanced STI frequency value exceeding a predetermined threshold;

forming a present track frequency value by calculating the centroid of adjacent stored STI frequency values;

correlating present track frequency values with past track frequency values to form and extend frequency tracks;

calculating the variance value for each present track frequency value and for a predetermined number of past frequency values corresponding to the same frequency track; and providing an alert signal in response to a variance value exceeding a predetermined threshold.

2. The alerting precess of claim 1 wherein said step of analyzing said first signal over a predetermined short interval to obtain the spectral energy of said first signal within contiguous incremental frequency bands extending over a frequency spectrum to obtain said short term integrated values further comprises the steps of:

sampling said first signal and performing a fast Fourier transform on said first signal with overlap and weighting.

3. The alerting process of claim 2 wherein said predetermined short interval is characterized as being predetermined within the range of 0.5 seconds to 2.0 seconds.

4. The alerting process of claim 1 wherein the step of correlating present track frequency values with past track frequency values to form and extend frequency tracks further comprises the step of saving stored STI frequency values that do not correlate with frequency tracks as fragments in a save pool.

5. The alerting process of claim 1 wherein said predetermined long term interval for integration is established to be in the range of 0.4 to 2.4 minutes.

6. The alerting process of claim 1 wherein the step of providing an alert signal in response to a variance value exceeding a predetermined threshold further comprises:

providing an audible alert signal to an operator.

7. The alerting process of claim 1 wherein the step of forming a present track frequency value by calculating the centroid of adjacent stored STI frequency values further comprises the steps of:

multiplying the value of each stored track frequency times the value of the respective energy level to obtain track frequency product values;

adding adjacent stored track frequency product values to obtain a track frequency product sum for each group of adjacent track frequencies;

calculating the average energy level for corresponding groups of adjacent stored frequency values; and dividing each track frequency product sum by the average energy level corresponding to said track frequency product sum to obtain an energy weighted mean frequency for energy values above the threshold.

8. The alerting process of claim 1 wherein the step of correlating present track frequency values with past track frequency values to form and extend frequency tracks further comprises the step of:

displaying the past track values as a LOFARGRAM; and calculating the variance value for each present track frequency value and for a predetermined number of past frequency values corresponding to the same frequency track.

9. The alerting process of claim 8 wherein the step of correlating present track frequency values with past track frequency values to form LOFARGRAMs further comprises the step of:

changing the color of a LOFARGRAM frequency track in response to a difference in value between the present calculated variance value and a past calculated variance value.

10. An alerting process comprising the steps of:

receiving at least a first signal from a signal source for a predetermined short interval;

analyzing said first signal over said predetermined short interval to obtain the spectral energy of said first signal within contiguous incremental frequency bands extending over a frequency spectrum, the energy value obtained for each incremental frequency band being stored as a short term integrated value in a memory at an address location corresponding to said incremental frequency;

integrating successive short term intègrated values over a predetermined long term interval to obtain a long term integrated value for each respective incremental frequency band;

dividing each short term integrated value by the corresponding long term integrated value to obtain an enhanced STI frequency value for each incremental frequency band;

storing the frequency of each enhanced STI frequency value exceeding a predetermined threshold;

forming a LOFARGRAM display from STI frequency values characterizing the energy weighted mean frequency of frequency tracks; and providing an alert signal in response to a variance of said enhanced STI frequency values outside of a predetermined limit.

11. The alerting process of claim 10 further comprising the step of changing the color of each LOFARGRAM frequency track in response to the variance of the frequency of a frequency track exceeding a predetermined limit.

12. An alerting system comprising:

means for receiving at least a first signal from a signal source for a predetermined short interval;

means for analyzing said first signal over said predetermined short interval to obtain the spectral energy of said first signal within contiguous incremental frequency bands extending over a frequency spectrum, the energy value obtained for each incremental frequency band being stored as a short term integrated value in a memory at an address location corresponding to said incremental frequency;

means for integrating successive short term integrated values over a predetermined long term interval to obtain a long term integrated value for each respective incremental frequency band;

means for dividing each short term integrated value by the corresponding long term integrated value to obtain an enhanced STI frequency value for each incremental frequency band;

means for storing the frequency of each enhanced STI frequency value exceeding a predetermined threshold;

means for forming a present track frequency value by calculating the centroid of adjacent stored STI frequency values;

means for correlating present track frequency values with past track frequency values to form and extend frequency tracks;

means for calculating the variance value for each present track frequency value and for a predetermined number of past frequency values corresponding to the same frequency track; and means for providing an alert signal in response to a variance value exceeding a predetermined threshold.

13. The process of claim 4 wherein said step saving enhanced STI values in a fragment pool further comprises the steps of:

comparing the centroid frequency of present enhanced STI values that do not correspond to a frequency track with past STI frequency values stored in a fragment pool;

passing non-correlated enhanced STI values to the fragment pool;

checking to see if a new track is formed for correlated values and passing new track data to a track pool storage means; and passing non-new track forming correlated enhanced STI values to the fragment pool.

14. The process of claim 1 wherein the step of correlating present track frequency values to past track frequency values comprises the steps of:

comparing the centroid frequency of a present track to past tracks to detect a correlation;

updating track frequency values with new correlated track frequency value data; and storing updated track value data in a track pool.

15. The process of claim 1 wherein the steps of analyzing over a short interval and storing integrated values further comprise the step of storing said integrated values in a memory at an address location corresponding to an incremental frequency.

* * * * *